US011890637B2

(12) United States Patent
Williams

(10) Patent No.: US 11,890,637 B2
(45) Date of Patent: Feb. 6, 2024

(54) EXPANDABLE ATTACHMENT FOR TUMBLER

(71) Applicant: The Tumbler Grip LLC, Deer Park, TX (US)

(72) Inventor: Brian D. Williams, Deer Park, TX (US)

(73) Assignee: The Tumbler Grip LLC, Deer Park, TX (US)

( * ) Notice: Subject to any disclaimer, the term of this patent is extended or adjusted under 35 U.S.C. 154(b) by 0 days.

(21) Appl. No.: 17/714,591

(22) Filed: Apr. 6, 2022

(65) Prior Publication Data

US 2022/0314269 A1 Oct. 6, 2022

Related U.S. Application Data

(60) Provisional application No. 63/171,442, filed on Apr. 6, 2021.

(51) Int. Cl.
*B05C 13/02* (2006.01)

(52) U.S. Cl.
CPC .................................. *B05C 13/025* (2013.01)

(58) Field of Classification Search
None
See application file for complete search history.

(56) References Cited

U.S. PATENT DOCUMENTS 2,015,086 A 9/1935 Paynter et al.
2,405,074 A 7/1946 Underwood
2,409,680 A 10/1946 Heeter
2,425,928 A 8/1947 Emerson
2,584,092 A 1/1952 Keller et al.
2,882,061 A * 4/1959 Johnson ................ B05C 13/025 279/2.12
2,917,994 A 12/1959 Tripp
3,112,692 A 12/1963 Cookson
3,525,303 A 8/1970 Cummings
3,634,174 A 1/1972 Warsager
4,010,681 A 3/1977 Hamberger et al.
4,380,964 A 4/1983 Abe et al.
(Continued)

OTHER PUBLICATIONS

The Tumbler Grip LLC Facebook Page (posts of Jan. 11, 2021; accessed May 26, 2023). (Year: 2021).*

*Primary Examiner* — Jethro M. Pence
(74) *Attorney, Agent, or Firm* — Smith IP Services, P.C.

(57) ABSTRACT

An expandable attachment for securing a beverage container to a turner can include a linkage with arms, each of the arms having opposite ends, a grip pad pivotably attached to an end of each of the arms, the grip pad being configured to grip an interior surface of the beverage container, a threaded member, a base, the threaded member being rigidly secured to the base, and an end of an arm being pivotably attached to the base, another base, the threaded member being axially displaceable through the second base, and an end of the other arm being pivotably attached to the second base, and an adjustment wheel having threads therein engaged with threads of the threaded member. A method can include inserting an expandable attachment into a beverage container, and rotating a portion of the expandable attachment, thereby radially outwardly displacing grip pads of the expandable attachment.

10 Claims, 7 Drawing Sheets

(56) References Cited

U.S. PATENT DOCUMENTS

| | | | | |
|---|---|---|---|---|
| 5,282,888 | A * | 2/1994 | Fukawa | B05C 3/09 294/93 |
| 5,709,770 | A | 1/1998 | Asghar et al. | |
| 6,223,653 | B1 | 5/2001 | Christ | |
| 6,709,514 | B1 * | 3/2004 | Hossainy | B05B 3/1014 118/500 |
| 6,962,110 | B2 | 11/2005 | Hellmeier et al. | |
| 7,523,946 | B2 * | 4/2009 | Schmitt | B05C 13/025 242/571.1 |
| 7,891,076 | B2 * | 2/2011 | Schmitt | B05C 13/025 29/559 |
| 9,032,872 | B2 | 5/2015 | Uptergrove | |
| 2004/0202791 | A1 * | 10/2004 | Schmitt | B05C 3/09 427/430.1 |
| 2006/0218807 | A1 * | 10/2006 | Bush | B05C 3/09 427/430.1 |
| 2008/0067728 | A1 * | 3/2008 | Plans | B05B 13/0442 269/47 |

* cited by examiner

EXPANDABLE ATTACHMENT FOR TUMBLER

CROSS-REFERENCE TO RELATED APPLICATION

The present application claims the benefit of the filing date of prior provisional application No. 63/171,442 filed on 6 Apr. 2021. The entire disclosure of the prior application is incorporated herein by this reference.

BACKGROUND

This disclosure relates generally to apparatus and methods used in conjunction with beverage containers and, in an example described below, more particularly provides an expandable attachment for securing a tumbler or other beverage container to a turner.

It is known to rotate a tumbler while applying decorative substances, such as epoxy, paint, etc., to an exterior of the tumbler. Rotation of the tumbler enables the decorative substances to be evenly and consistently applied to the exterior of the tumbler. The tumbler is typically rotated by means of a motorized turner provided with an attachment having a foam insert that is received in an interior of the tumbler.

It will, therefore, be readily appreciated that improvements are continually needed in the art of rotating tumblers and other types of beverage containers. Such improvements may be used for applying decorative substances to an exterior of a tumbler, or for other purposes.

DETAILED DESCRIPTION

Figure 1:
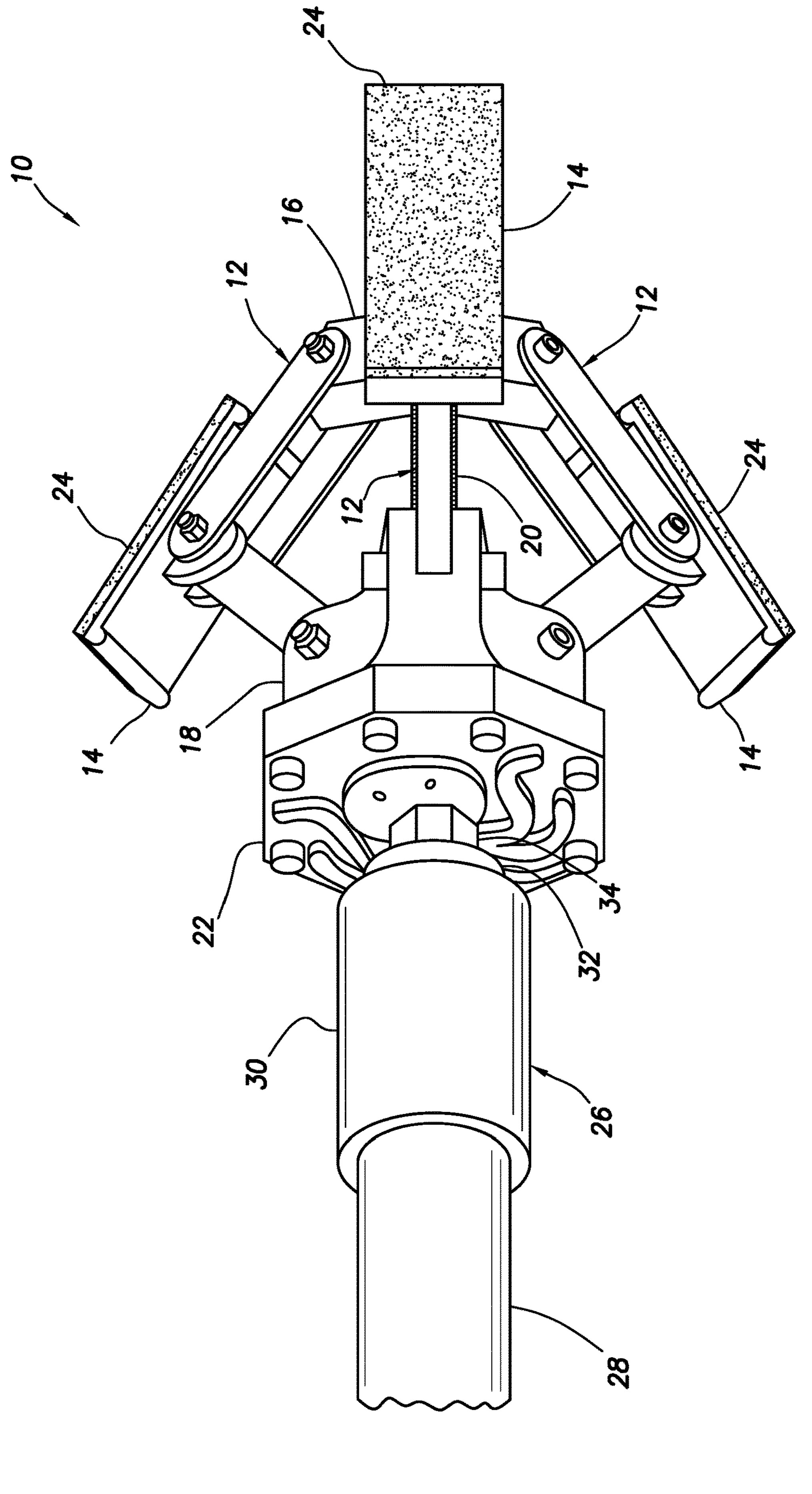
FIG. 1 is a representative perspective view of an example of an expandable attachment and associated method which can embody principles of this disclosure.

Representatively illustrated in FIG. 1 is an expandable attachment 10 and associated method which can embody principles of this disclosure. However, it should be clearly understood that the expandable attachment 10 and method are merely one example of an application of the principles of this disclosure in practice, and a wide variety of other examples are possible. Therefore, the scope of this disclosure is not limited at all to the details of the expandable attachment 10 and method described herein and/or depicted in the drawings.

In the FIG. 1 example, the expandable attachment 10 includes three sets of linkages 12 and grip pads 14 connected between a pivot base 16 and another pivot base 18. In other examples, other numbers of linkages and grip pads may be used.

A threaded member 20 extends through the bases 16, 18. An adjustment wheel 22 is threaded onto the threaded member 20, so that an axial distance between the bases 16, 18 can be varied, depending on how far the wheel is threaded onto the threaded member.

The threaded member 20 further extends past the adjustment wheel 22 and is threaded into a fixture 26 configured to mount the expandable attachment 10 to a turner for rotating the expandable attachment, and to a beverage container (such as, a tumbler) in which the expandable attachment is received.

As depicted in FIG. 1, each of the grip pads 14 has a friction layer 24 on an external surface of the grip pad. In this example, the friction layer 24 comprises a resilient material (such as, rubber) adhered to the external surface of the grip pad 14. For example, a rubberized self-adhesive tape can be a suitable friction layer for use on the grip pad 14.

The fixture 26 in the FIG. 1 example includes a pipe 28, a coupling 30, an adapter 32 and a nut 34. The pipe 28 attaches the fixture 26 to the turner. The nut 34 threads onto the threaded member 20, which extends outwardly from the adjustment wheel 22.

In operation, the fixture 26 can initially be disconnected from the threaded member 20. The adjustment wheel 22 is threaded sufficiently far along the threaded member 20 (in the leftward direction as viewed in FIG. 1) to permit the grip pads 14 to be received in an interior of the beverage container. The expandable attachment 10 is then inserted into the interior of the beverage container.

The adjustment wheel 22 is then threaded onto the threaded member 20 (in the rightward direction as viewed in FIG. 1), until the grip pads 14 contact an interior surface of the beverage container. The adjustment wheel 22 can be threaded further onto the threaded member 20 to thereby increase a gripping force exerted by the grip pads 14 against the interior surface of the beverage container.

When the adjustment wheel 22 is threaded onto the threaded member 20, an axial distance between the bases 16, 18 is decreased. The linkages 12 are configured so that, as the axial distance between the bases 16, 18 decreases, the grip pads 14 displace radially outward. The threaded member 20 can displace axially through the base 18. However, the threaded member 20 is secured to the base 16, so that relative axial displacement between the base 16 and the threaded member is prevented.

When the grip pads 14 are sufficiently grippingly engaged with the interior surface of the beverage container, the fixture 26 can be attached to the expandable attachment 10 by threading the threaded member 20 into the nut 34. The fixture 26 and the expandable attachment 10 can then be attached to the turner. In other examples, the fixture 26 could be attached to the expandable attachment 10 prior to radially outwardly extending the grip pads 14.

Figure 2:
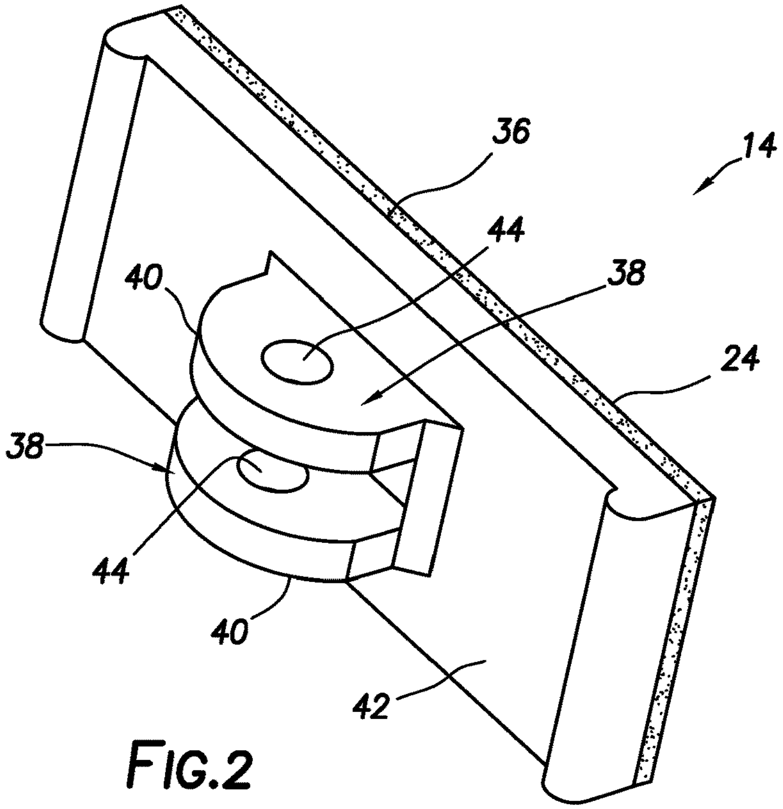
FIG. 2 is a representative perspective view of a grip pad of the expandable attachment.

Referring additionally now to FIG. 2, a perspective view of an example of the grip pad 14 is representatively illustrated. In this view, it can be seen that the grip pad 14 includes the friction layer 24 on an external surface 36 of the grip pad. In other examples, the grip pad 14 could instead have a roughened, toothed, serrated or other type of gripping treatment on the external surface 36.

The grip pad 14 also includes one or more pivots 38 for pivotably attaching arms of a linkage 12 to the grip pad. In this example, each pivot 38 includes a tab 40 extending from an internal surface 42 of the grip pad 14, and an opening 44 formed through each tab.

Figure 3:
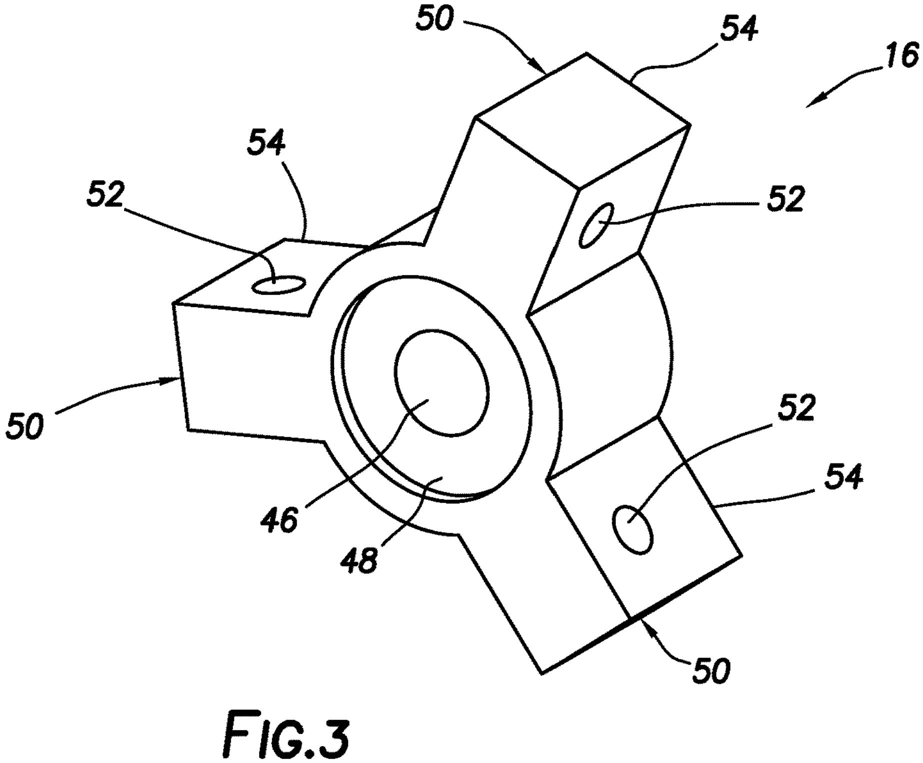
FIG. 3 is a representative perspective view of a pivot base of the expandable attachment.

Referring additionally now to FIG. 3, a perspective view of an example of the pivot base 16 is representatively illustrated. In this view, it can be seen that the pivot base 16 includes an opening 46 through which the threaded member 20 can pass. In the FIG. 3 example, a recess 48 is provided for receiving a lock nut (not shown in FIG. 3) for securing the threaded member 20 against axial movement relative to the base 16.

Three pivots 50 extend radially outward on the base 16. Each of the pivots 50 includes an opening 52 formed through a support 54. The pivots 50 provide for pivotably attaching the linkages 12 to the base 16.

Figure 4:
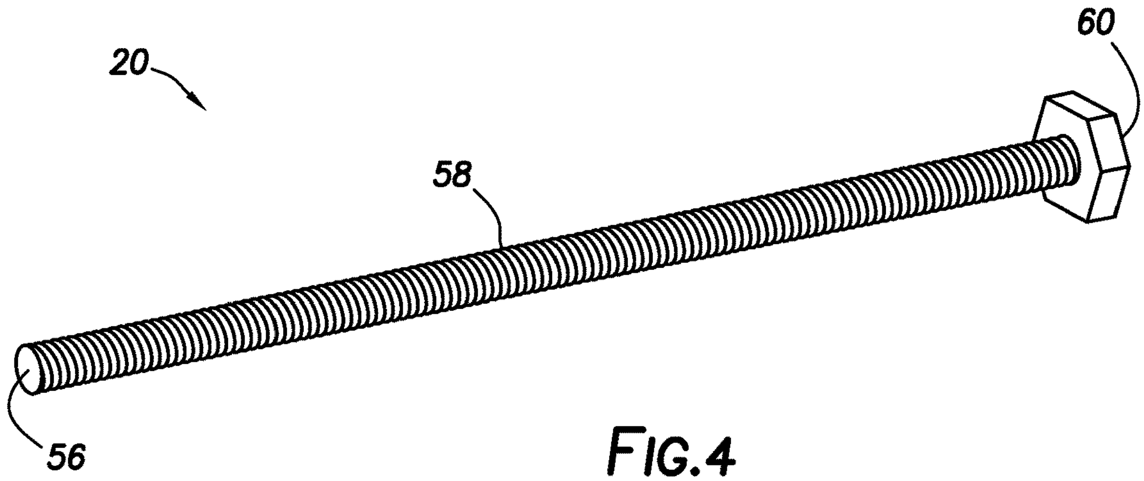
FIG. 4 is a representative perspective view of a threaded member of the expandable attachment.

Referring additionally now to FIG. 4, a perspective view of an example of the threaded member 20 is representatively illustrated. In this view, it can be seen that the threaded member 20 includes a shaft 56 with threads 58 formed thereon, and a hexagonal head 60.

The pivot base 16 can be secured against axial movement relative to the threaded member 20 by passing the shaft 56 through the opening 46 in the base 16, and then threading a lock nut onto the shaft. The lock nut will be received partially in the recess 48, as mentioned above. In some examples, the lock nut could be sufficiently tightened against the base 16, so that relative rotation between the base 16 and the threaded member 20 is prevented. Alternatively, the opening 46 and the shaft 56 could be complementarily configured so that relative rotation between the base 16 and the threaded member 20 is prevented.

Figure 5:
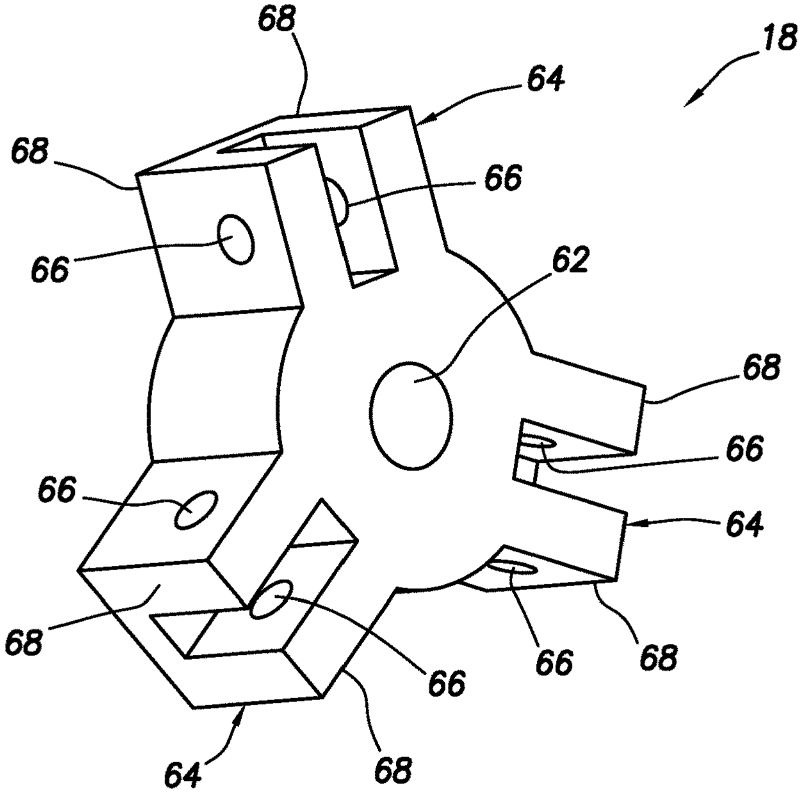
FIG. 5 is a representative perspective view of another pivot base of the expandable attachment.

Referring additionally now to FIG. 5, a perspective view of an example of the pivot base 18 is representatively illustrated. In this view, it can be seen that the pivot base 18 includes an opening 62 through which the threaded member 20 can pass. Axial displacement of the threaded member 20 through the opening 62 is permitted.

Three pivots 64 extend radially outward on the base 18. Each of the pivots 64 includes openings 66 formed through supports 68. The pivots 64 provide for pivotably attaching the linkages 12 to the base 18.

Figure 6:
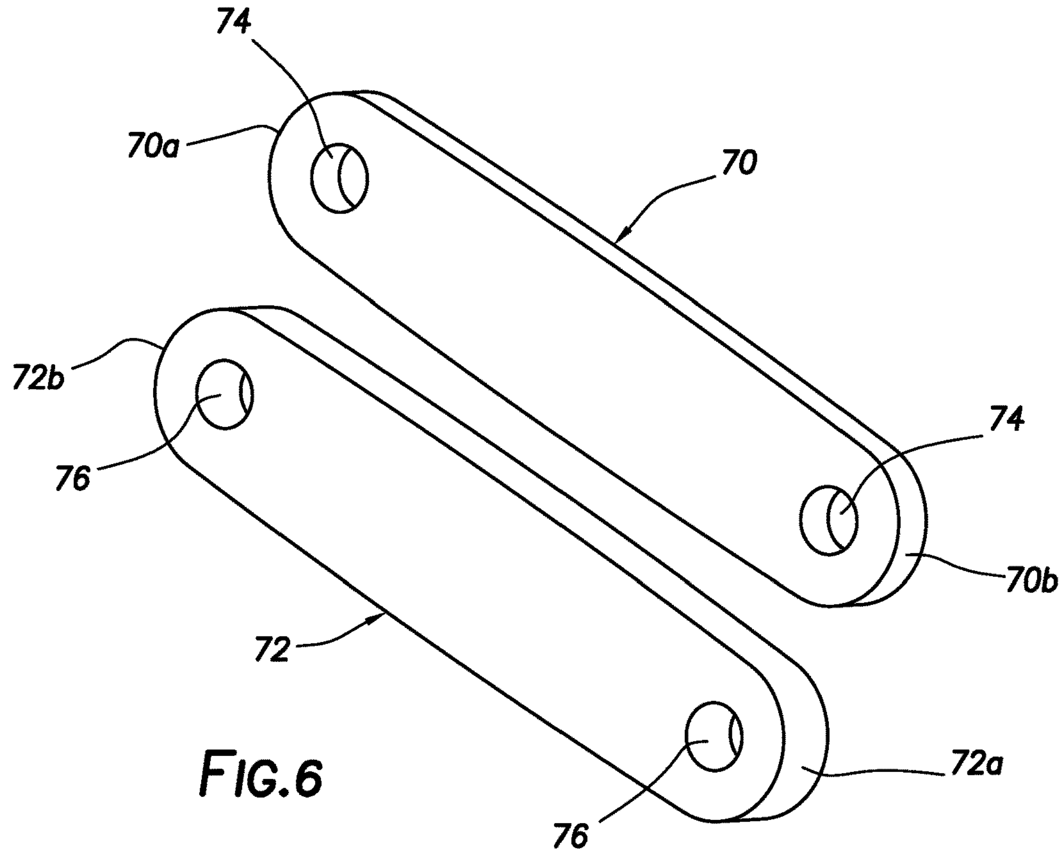
FIG. 6 is a representative perspective view of linkage arms of the expandable attachment.

Referring additionally now to FIG. 6, a perspective views of arms 70, 72 of a linkage 12 are representatively illustrated. In the FIG. 1 example, each linkage 12 includes two of the arm 70 and one of the arm 72. The arms 70 are connected between the pivot base 16 and the grip pad 14, and the arm 72 is connected between the grip pad and the pivot base 18.

The arm 70 has opposite ends 70*a,b* with openings 74 formed through each end. The arm 72 has opposite ends 72*a,b* with openings 76 formed through each end. In the FIG. 1 example, the end 70*b* of the arm 70 is pivotably attached to the pivot 50 of the base 16, and the end 70*a* of the arm 70 is pivotably attached to the pivot 38 of the grip pad 14. The end 72*b* of the arm 72 is pivotably attached to the pivot 64 of the base 18, and the end 72*a* of the arm 72 is pivotably attached to the pivot 38 of the grip pad 14.

Figure 7:
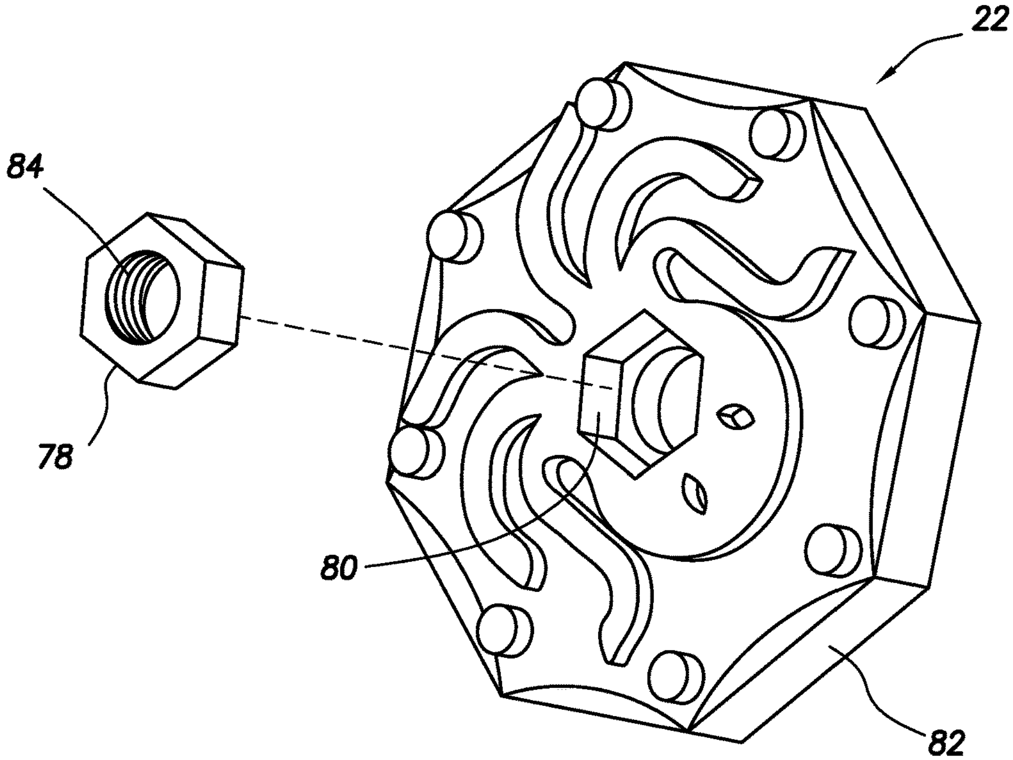
FIG. 7 is a representative perspective view of a wheel of the expandable attachment.

Referring additionally now to FIG. 7, a perspective exploded view of an example of the adjustment wheel 22 is representatively illustrated. In this view, it may be seen that the wheel 22 includes a nut 78, which is press fit into a hexagonal recess 80 formed in an octagonal shaped wheel structure 82. Other shapes may be used in other examples.

In the FIG. 1 example, the nut 78 includes internal threads 84 which are engaged with the threads 58 of the threaded member 20. In other examples, the threads 84 could be formed directly in the structure 82, without use of the separate nut 78.

Figure 8:
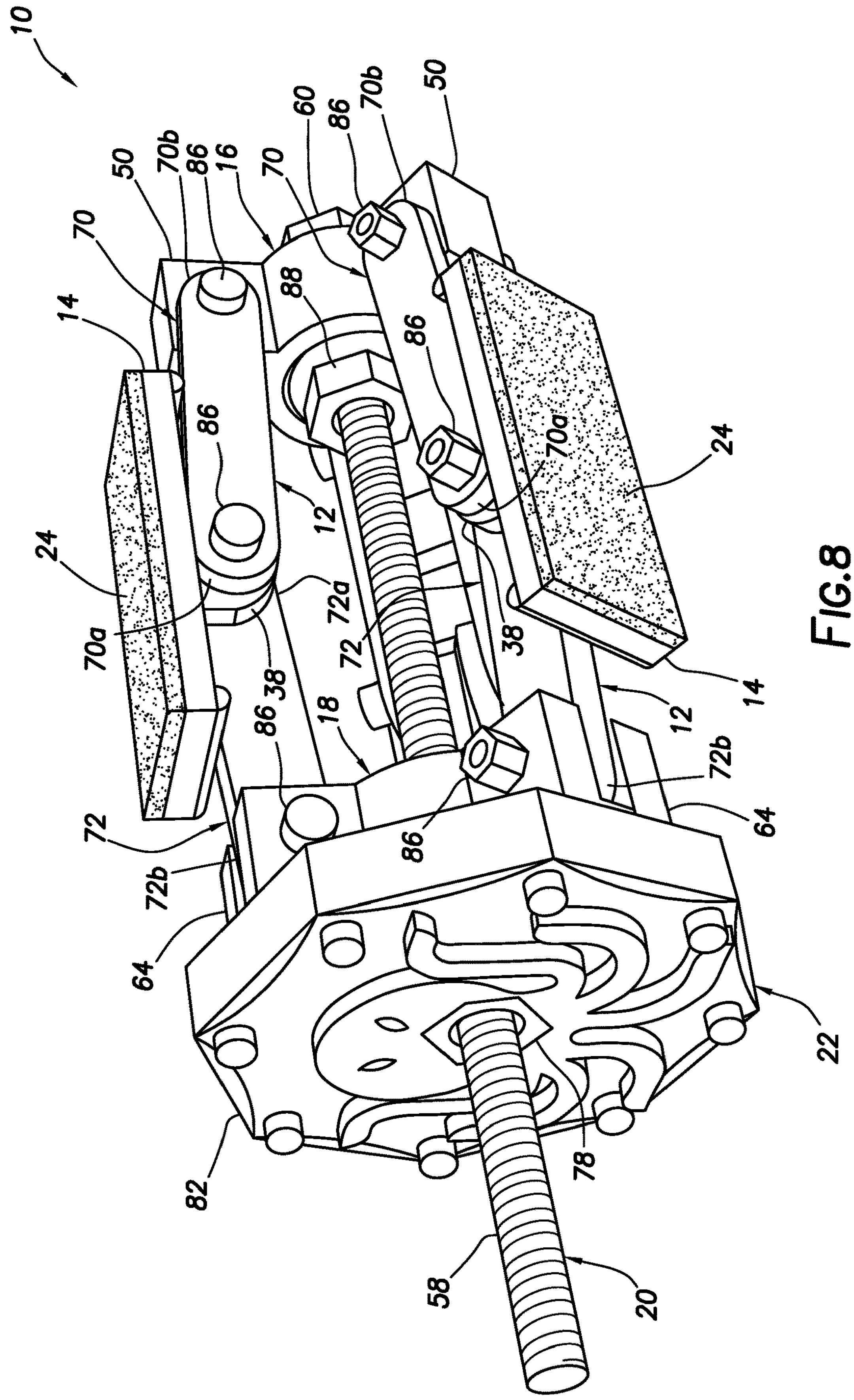
FIG. 8 is a representative perspective view of the expandable attachment in a radially retracted configuration.

Referring additionally now to FIG. 8, a perspective view of the expandable attachment 10 is representatively illustrated. In this view, the expandable attachment 10 is depicted in a radially retracted configuration. In this configuration, the expandable attachment 10 can be inserted into an interior of a beverage container, or removed from the beverage container.

At each of the pivots 38, 50, 64 of the grip pads 14 and bases 16, 18, fasteners 86 extend through the openings 44, 52, 66 of the pivots 38, 50, 64. The fasteners 86 permit relative rotation between the grip pads 14, bases 16, 18 and arms 70, 72.

Note that the base 16 is axially retained between the head 60 of the threaded member 20 and a lock nut 88 threaded onto the threaded member. Thus, when the adjustment wheel 22 is rotated, the adjustment wheel and the base 18 can displace axially along the threaded member 20, but the base 16 remains axially stationary relative to the threaded member, so that the axial distance between the bases 16, 18 is varied.

Figure 9:
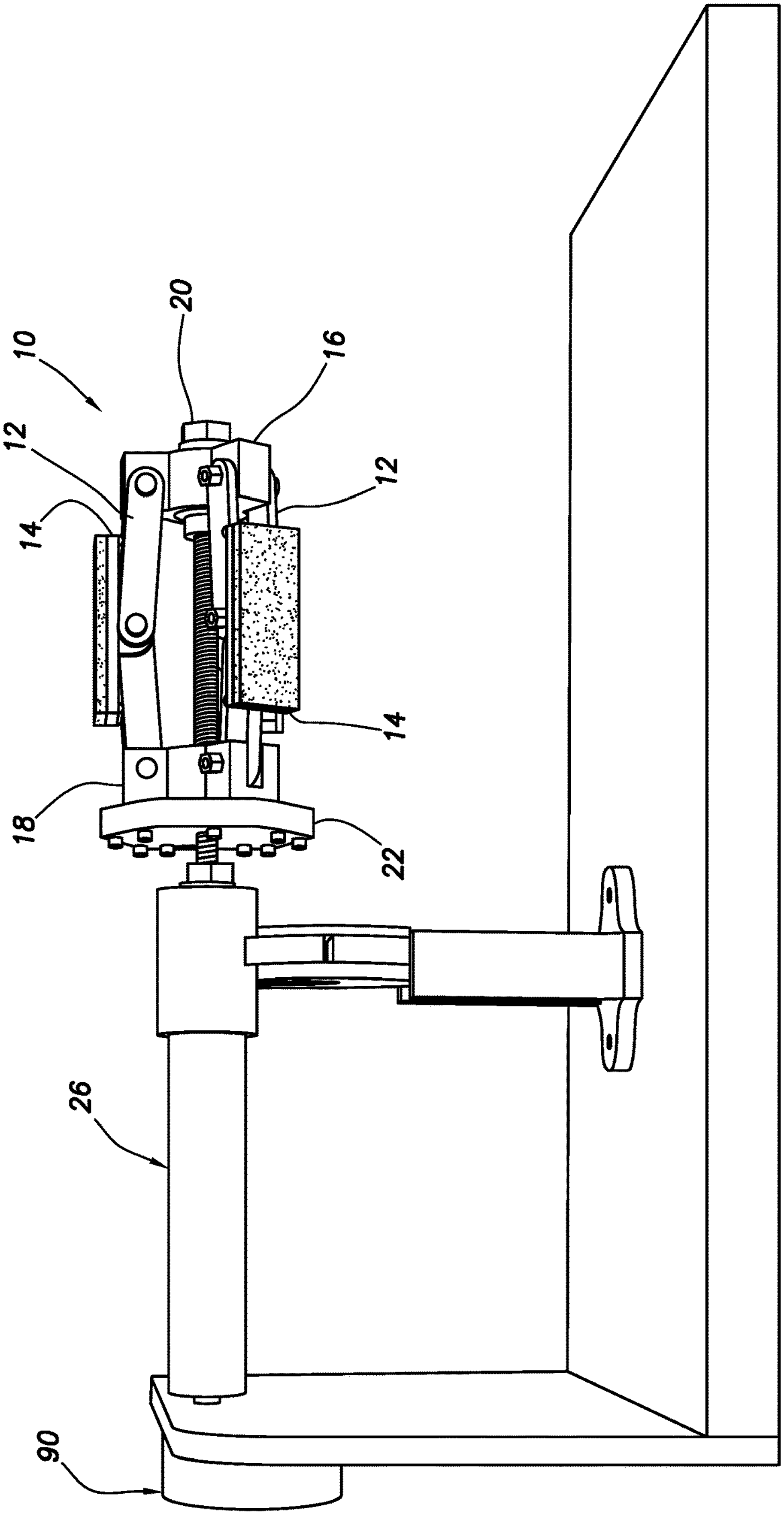
FIG. 9 is a representative side view of the expandable attachment in the retracted configuration connected to a turner.

Referring additionally now to FIG. 9, a side view of the expandable attachment 10 in the retracted configuration is representatively illustrated. In this view, the expandable attachment 10 is connected to the fixture 26, which is in turn connected to a turner 90. The turner 90 is used to rotate the expandable attachment 10 and a beverage container supported by the expandable attachment (see FIG. 10).

Note that, in some examples the fixture 26 can be considered a part of the expandable attachment 10. Thus, in some examples the fixture 26 and the expandable attachment 10 may be provided as a single assembly, or in other examples the fixture and the expandable attachment could be separate assemblies.

Although in FIG. 9 the expandable attachment 10 is depicted in the retracted configuration and connected to the fixture 26 and turner 90, in a preferred method of use the expandable attachment is connected to the fixture, and the fixture is connected to the turner 90, after the expandable attachment is expanded within a beverage container. Therefore, it should be clearly understood that any order of the steps of the method may be performed, in keeping with the scope of this disclosure.

Figure 10:
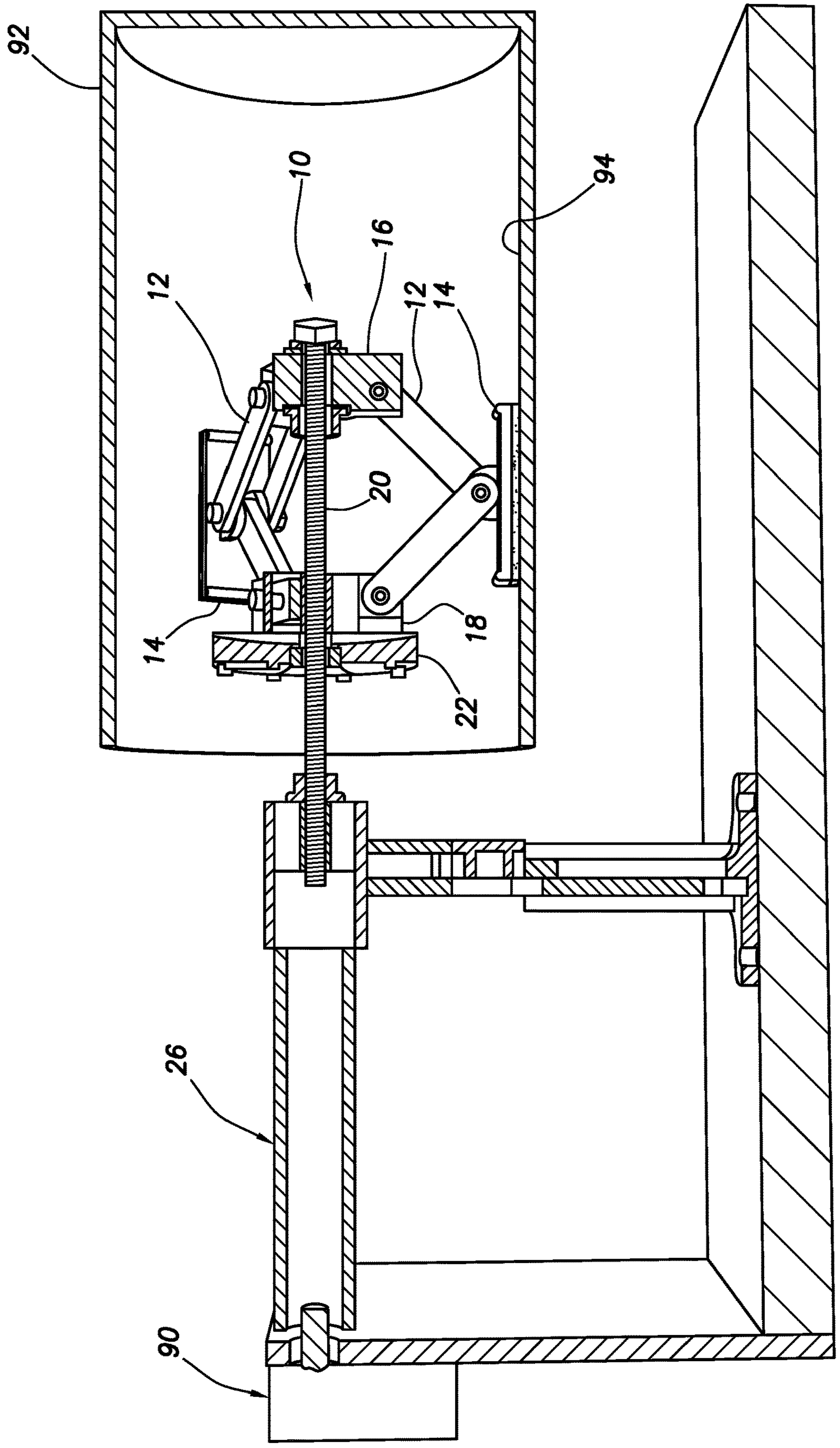
FIG. 10 is a representative cross-sectional view of the expandable attachment in a radially expanded configuration in a beverage container and connected to the turner.

Referring additionally now to FIG. 10, a cross-sectional view of the expandable attachment 10 in a radially expanded configuration is representatively illustrated. In this view, the expandable attachment 10 is expanded within the interior of a beverage container 92 (such as, a tumbler, a glass, etc.).

The expandable attachment 10 is expanded from the retracted configuration to the expanded configuration by threading the adjustment wheel 20 further onto the threaded member 20 (to the right as viewed in FIG. 10 if the threads 58, 84 are right-hand threads). This displaces the base 18 toward the base 16 and causes the ends 70*a*, 72*a* of the arms 70, 72 (see FIG. 8) to displace radially outward. The radially outward displacement of the ends 70*a*, 72*a* displaces the grip pads 14 radially outward, until the grip pads contact an interior surface 94 of the beverage container 92. The adjustment wheel 22 may be further threaded onto the threaded member 20 after the grip pads 14 have contacted the interior surface 94, in order to increase a contact pressure between the grip pads and the interior surface.

In a preferred method of use, the expandable attachment 10 is expanded in the beverage container 92, then the fixture 26 is threaded onto the threaded member 20, and then the fixture is connected to the turner 90. The expandable attachment 10 and the beverage container 92 can then be rotated by the turner 90. However, as mentioned above, the order of steps in the method can be varied in keeping with the scope of this disclosure.

It may now be fully appreciated that the above disclosure provides significant improvements to the art of rotating tumblers and other types of beverage containers. The expandable attachment 10 described above more securely mounts the beverage container 92 to the turner 90, as compared to prior foam inserts, which permit the beverage container to wobble while it is being rotated.

The above disclosure provides to the art an expandable attachment 10 for securing a beverage container 92 to a turner 90 capable of rotating the beverage container 92. In one example, the expandable attachment 10 comprises: at least one linkage 12 comprising first and second arms 70, 72, each of the first and second arms 70, 72 having first and second opposite ends 70*a,b*, 72*a,b*; a grip pad 14 pivotably attached to the first ends 70*a*, 72*a* of the first and second arms 70, 72, the grip pad 14 being configured to grip an interior surface 94 of the beverage container 92; a threaded member 20; a first base 16, the threaded member 20 being secured against axial displacement relative to the first base 16, and the first arm second end 70*b* being pivotably attached to the first base 16; a second base 18, the threaded member 20 being axially displaceable through the second base 18, and the second arm second end 72*b* being pivotably attached to the second base 18; and an adjustment wheel 22 having threads 84 therein engaged with threads 58 of the threaded member 20.

Rotation of the wheel 22 relative to the threaded member 20 displaces the second base 18 axially relative to the first base 16. Rotation of the wheel 22 relative to the threaded member 20 displaces the grip pad 14 radially relative to the threaded member 20.

The "at least one" linkage 12 may comprise at least first, second and third linkages 12. The first, second and third linkages 12 can be pivotably attached to each of the first and second bases 16, 18.

The grip pad 14 can include a pivot 38 attached to each of the first ends 70*a*, 72*a* of the first and second arms 70, 72. The grip pad 14 can include an external surface 36, and a friction layer 24 may be secured to the external surface 36.

The friction layer 24 may comprise a resilient material adhered to the external surface 36. The material may comprise rubber.

The adjustment wheel threads 58 may be formed in a nut 78. The nut 78 may be press fit into the wheel 22.

Also provided to the art by the above disclosure is a method of securing a beverage container 92 to a turner 90 adapted to rotate the beverage container 92. In one example, the method can comprise: inserting an expandable attachment 10 into an interior of the beverage container 92; and rotating a portion of the expandable attachment 10, thereby radially outwardly displacing grip pads 14 of the expandable attachment 10, so that the grip pads 14 grip an interior surface 94 of the beverage container 92.

The expandable attachment portion can comprise an adjustment wheel 22 having threads 84 therein. The adjustment wheel threads 84 may be engaged with external threads 58 of a threaded member 20.

The rotating step can comprise axially compressing linkages 12 of the expandable attachment 10. Each of the grip pads 14 may be pivotably attached to a respective one of the linkages 12.

Each of the linkages 12 may be pivotably attached to a first base 16 of the expandable attachment 10. Each of the linkages 12 may be pivotably attached to a second base 18 of the expandable attachment 10. The rotating step may comprise displacing the second base 18 axially toward the first base 16.

A threaded member 20 may be secured against axial displacement relative to the first base 16, and the threaded member 20 may be axially displaceable through the second base 18. The rotating step may comprise displacing the expandable attachment portion (e.g., the adjustment wheel 22) along the threaded member 20, thereby biasing the second base 18 toward the first base 16.

The method may include securing the expandable attachment 10 to the turner 90. The step of securing the expandable attachment 10 to the turner 90 may be performed prior to the rotating step.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "rightward," "leftward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. An expandable attachment for securing a beverage container to a turner capable of rotating the beverage container, the expandable attachment comprising:

at least one linkage comprising first and second arms, each of the first and second arms having first and second opposite ends;

a grip pad pivotably attached to the first ends of the first and second arms, the grip pad being configured to grip an interior surface of the beverage container;

a threaded member;

a first base, the threaded member being secured against axial displacement relative to the first base, and the first arm second end being pivotably attached to the first base;

a second base, the threaded member being axially displaceable through the second base, and the second arm second end being pivotably attached to the second base; and an adjustment wheel having threads therein engaged with threads of the threaded member.

2. The expandable attachment of claim 1, in which rotation of the wheel relative to the threaded member displaces the second base axially relative to the first base.

3. The expandable attachment of claim 1, in which rotation of the wheel relative to the threaded member displaces the grip pad radially relative to the threaded member.

4. The expandable attachment of claim 1, in which the at least one linkage comprises at least first, second and third linkages.

5. The expandable attachment of claim 4, in which the first, second and third linkages are pivotably attached to each of the first and second bases.

6. The expandable attachment of claim 1, in which the grip pad comprises a pivot attached to each of the first ends of the first and second arms.

7. The expandable attachment of claim 1, in which the grip pad comprises an external surface, and further comprising a friction layer secured to the external surface.

8. The expandable attachment of claim 7, in which the friction layer comprises a resilient material adhered to the external surface.

9. The expandable attachment of claim 8, in which the material comprises rubber.

10. The expandable attachment of claim 1, in which the adjustment wheel threads are formed in a nut, the nut being press fit into the wheel.

* * * * *